(12) United States Patent
Takada et al.

(10) Patent No.: US 6,661,458 B1
(45) Date of Patent: Dec. 9, 2003

(54) IMAGE PICKUP APPARATUS AND IMAGE PICKUP APPARATUS SYSTEM

(75) Inventors: Katsuhiro Takada, Hidaka (JP); Tetsuhide Takeyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/426,867

(22) Filed: Oct. 26, 1999

(30) Foreign Application Priority Data

Oct. 8, 1999 (JP) ............................................. 11-287733

(51) Int. Cl.$^7$ .......................... H04N 5/335; H04N 5/225
(52) U.S. Cl. ...................... 348/273; 348/360; 348/335; 348/272
(58) Field of Search ................................. 348/335, 340, 348/360, 272, 273; 359/689, 690

(56) References Cited

U.S. PATENT DOCUMENTS

| | | | | |
|---|---|---|---|---|
| 5,121,223 A | * | 6/1992 | Roe | 358/3.07 |
| 5,541,653 A | * | 7/1996 | Peters et al. | 348/264 |
| 5,721,628 A | * | 2/1998 | Takaragi et al. | 358/518 |
| 5,940,634 A | * | 8/1999 | Nakamura | 396/104 |
| 6,046,772 A | * | 4/2000 | Howell | 348/273 |
| 6,259,473 B1 | * | 7/2001 | Iko et al. | 348/80 |
| 6,429,895 B1 | * | 8/2002 | Onuki | 348/208.99 |

* cited by examiner

Primary Examiner—Aung S. Moe
Assistant Examiner—Lin Ye
(74) Attorney, Agent, or Firm—Pillsbury Winthrop LLP

(57) ABSTRACT

The present invention relates to a compact and low-cost image pickup apparatus capable of providing high-quality images comparable to silver halide photographs and also capable of obtaining photographic effects equivalent to those which are available for silver halide photographs, e.g. utilization of blurring. In the image pickup apparatus, an image of an object produced by an optical system is formed on an electronic image pickup device, thereby obtaining image information concerning the object. The image pickup device 20 is a device having a matrix or mosaic color filter array provided over a photoelectric conversion surface, and the electronic image pickup device 20 and the optical system 10 satisfy the conditions: (1) $6.2/\sqrt{N} < P < 21/\sqrt{N}$; (2) $3.8 < N < 20$; (3) $3.4 \times P - 25 < N < 20$; and (4) $0 < \theta < 1.3 \times P + 4$; where P is the pixel pitch (given in micrometers) of the image pickup device; N is the number of pixels (given in million) of the image pickup device; and $\theta$ is the angle (°) at which the central ray of a light beam exiting from the optical system or a ray passing through the center of the stop is incident on the image pickup device at the maximum image height.

6 Claims, 10 Drawing Sheets

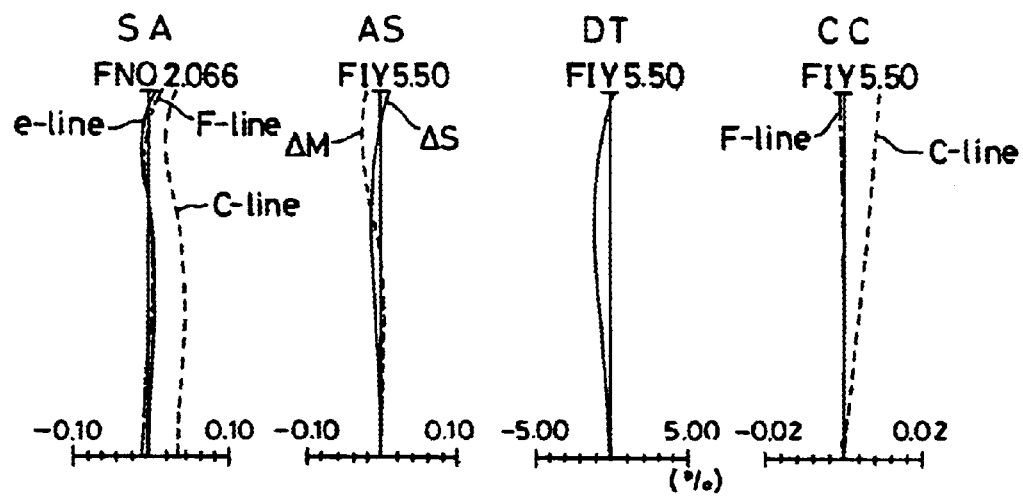
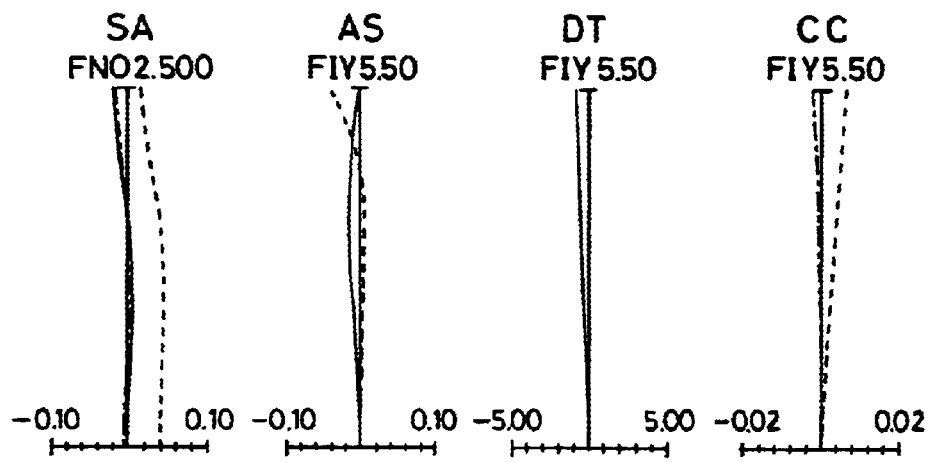
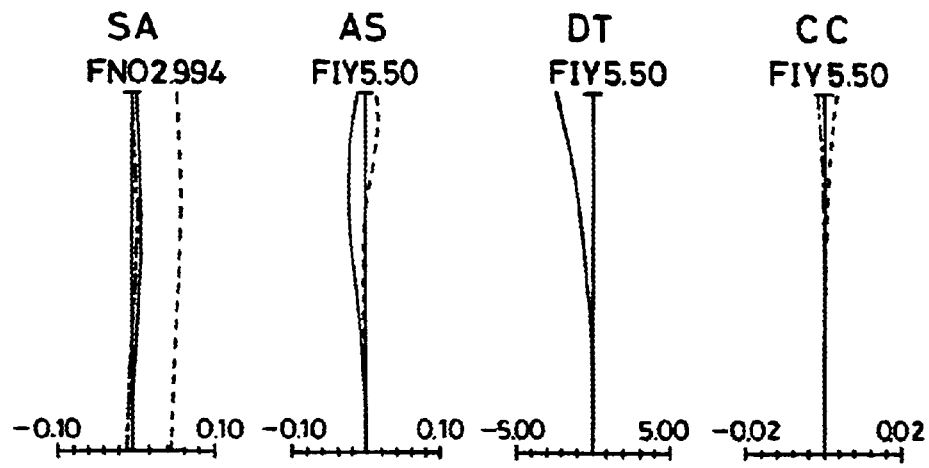

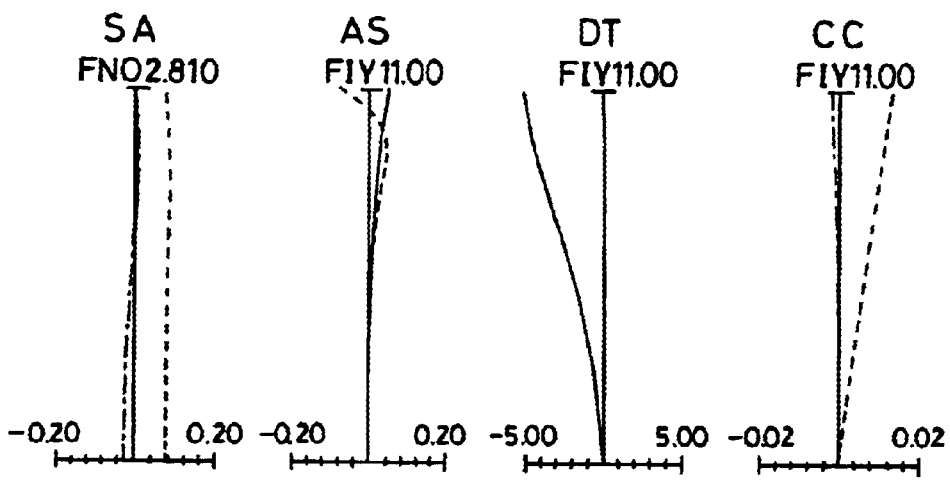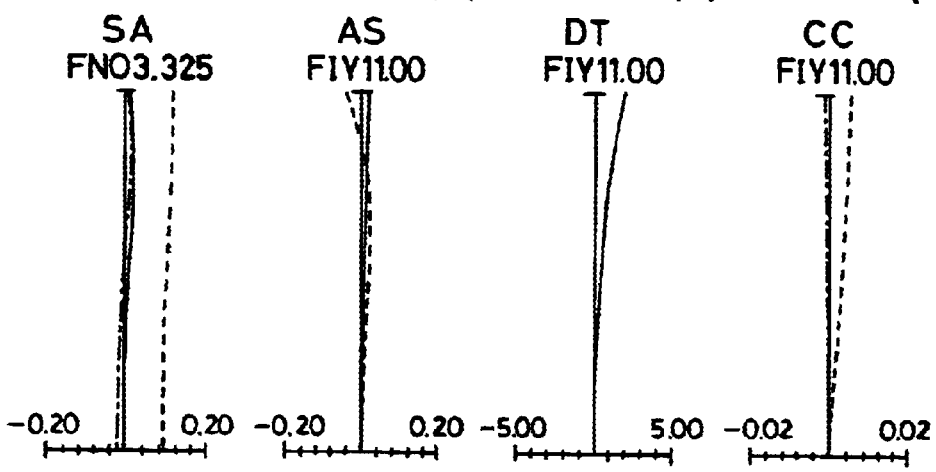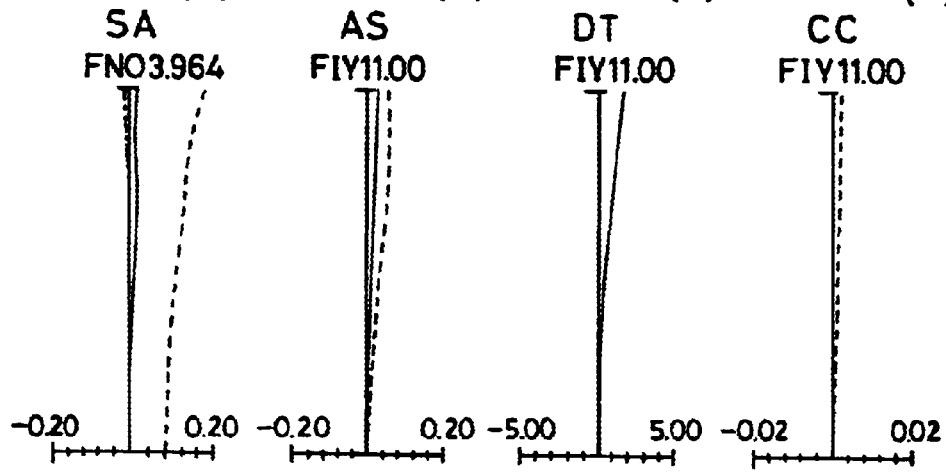

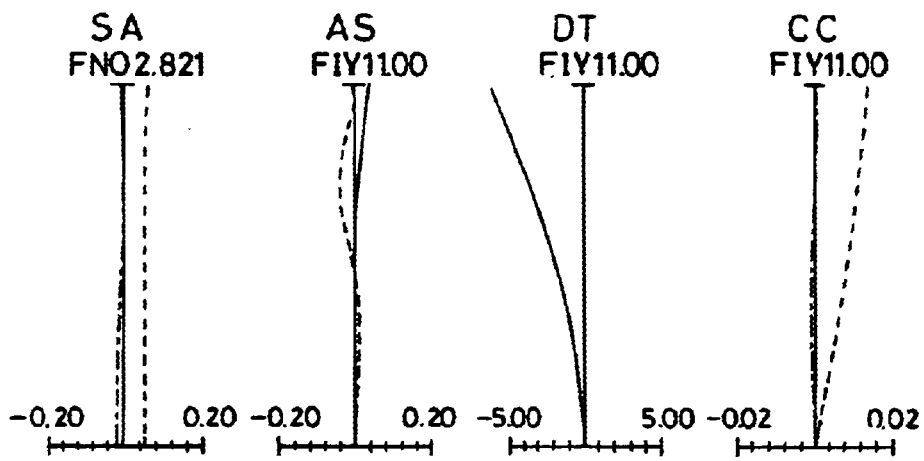
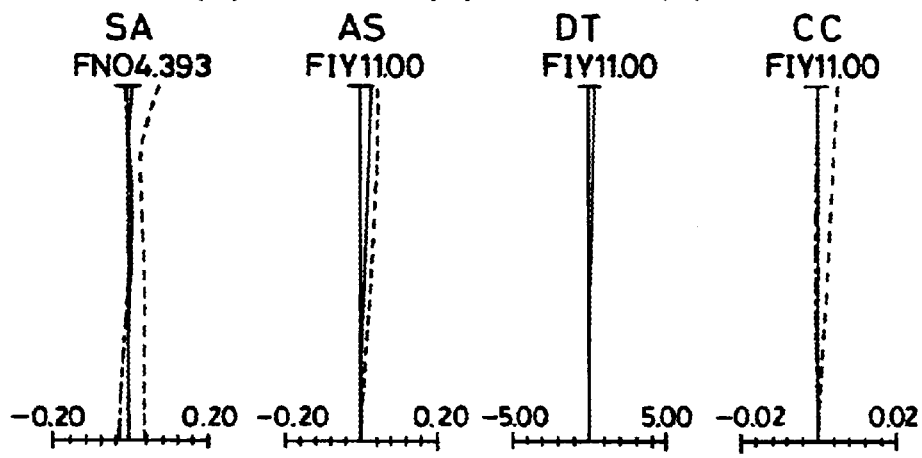
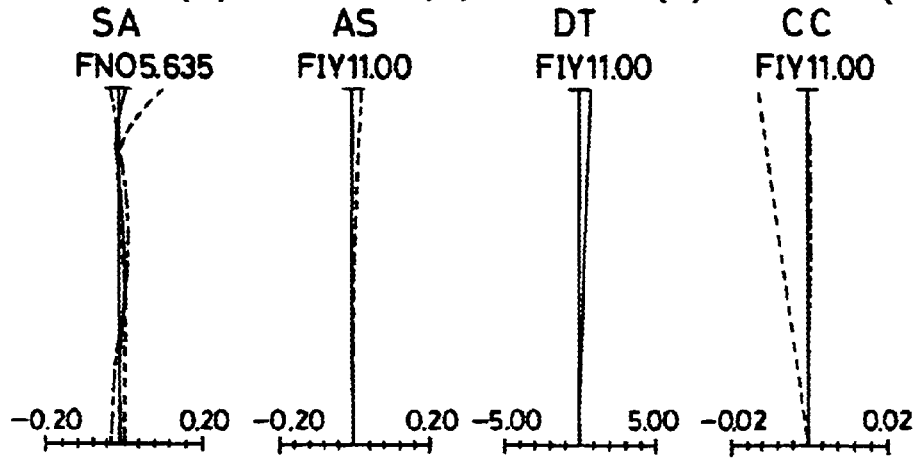

IMAGE PICKUP APPARATUS AND IMAGE PICKUP APPARATUS SYSTEM

BACKGROUND OF THE INVENTION

The present invention relates to an image pickup apparatus and an image pickup apparatus system. More particularly, the present invention relates to a compact and low-cost image pickup apparatus that is capable of photographing high-quality images comparable to silver halide photographs and also capable of obtaining photographic effects equivalent to those which are available for silver halide photographs, e.g. utilization of blurring and cropping.

There are digital cameras designed for business use, e.g. printing, which are capable of obtaining images comparable in quality to photographs. In many of these digital cameras, the pixel pitch of the image pickup device is about 10 micrometers or more, and the number of pixels is 2 million or more. The size of the image pickup device is the APS size or larger in terms of the size of silver halide film. Many of these digital cameras use an optical system developed for conventional silver halide photography.

In these image pickup apparatuses, the correlation between the depth of field and the field angle is close to that in silver halide photography because they use an image pickup device having a format size close to that of silver halide film. Therefore, it is possible to obtain photographic effects equivalent to those which are available for silver halide photographs, e.g. utilization of blurring associated with the depth of field.

However, image pickup devices used in these image pickup apparatuses are relatively large in size. Therefore, there is a limit to the number of devices obtained from one wafer. Consequently, the cost cannot be reduced in excess of a certain limit.

In addition, because optical systems used for photography are those developed for the conventional silver halide photography, no consideration is given to problems inherent in apparatuses using an image pickup device, for example, the deterioration of image information due to the fact that the aperture portion has a fixed size and the integral of the amount of light entering the aperture portion becomes an image signal, and the effect of filters such as an optical low-pass filter for removing moire and an infrared cutoff filter for eliminating adverse effects of infrared rays on the image, and further the effect of the physical structure of the image pickup device on the image.

In the case of silver halide film, a color image is made up of layered portions that form C, M and Y color images, respectively. In the case of an electronic image pickup device, because a plurality of color images cannot separately be formed in one pixel, the common practice is to employ a method in which a plurality of photographing operations are carried out for each color, and color images thus obtained are combined together afterward, or a method in which a plurality of images of different colors are formed with a plurality of image pickup devices provided for a plurality of branched optical paths, or a method in which color filter elements are arrayed in a matrix over the image pickup surface of an image pickup device, and pixels are associated with the respective colors of the filter elements, and in which an intensity concerning a color other than the associated filter colors is obtained by a computation from surrounding pixels or other technique.

The first method has the problem that a moving object cannot be photographed because it takes time to take a photograph. The second method has the problem that the cost increases because it requires a plurality of image pickup devices and a member for branching the optical path, and the apparatus becomes unfavorably large in size because the optical path branching member is inserted between the optical system and the image pickup devices. Accordingly, to realize a compact and low-cost apparatus, it is desirable to employ the third method.

In this case, the matrix filter array requires a certain thickness because it is necessary to impart a specific spectral transmittance to each filter element. Moreover, it is impossible to infinitely narrow the spacing between the filter array and the photoelectric conversion surface because of the electrode structure and the method of forming the photoelectric conversion surface.

Accordingly, if light is incident on the image pickup device extremely obliquely, light passing through a filter element enters a photoelectric conversion surface region other than the one that is associated with this filter element and where the light should arrive. This makes it impossible to obtain color information accurately.

It is also conceivable to form an infrared cutoff filter and color filters from interference filters that utilize a dielectric multilayer film, thereby minimizing the thickness of the filters. However, such an interference filter involves the problems that the transmittance varies according to the incident angle of light because the interference filter performs its function on the basis of the optical path length of light passing through the filter.

Accordingly, in the case of an apparatus using a image pickup device, it is desirable that the angle at which light exiting from the optical system is incident on the image pickup device, particularly the incident angle of the principal ray, should be minimized.

However, there is no severe restriction on the exit angle of optical systems designed for silver halide photography. Therefore, the image pickup apparatus cannot use any of the optical systems lined up for silver halide photography.

Incidentally, the most effective way of reducing the production cost of image pickup devices is to reduce the device size so that an increased number of devices are obtained from one wafer.

Many of image pickup apparatus that have been commercially manufactured as relatively low-cost apparatus use image pickup devices of ⅓ to ⅔ inch size and with about 1 to 2.5 million pixels.

The pixel pitch of these image pickup devices is about 3 to 5 micrometers, which is markedly small in comparison to image pickup devices used in the above-described digital cameras for business use. It is known that if the number of pixels is further increased to attain image quality comparable to that of silver halide photographs by using an image pickup device of the above-described size, the pixel pitch also inevitably decreases, so that it becomes impossible to ignore the reduction in sensitivity of the image pickup device and the degradation of image quality caused by shot noise arising from the photon number fluctuation.

These image pickup apparatuses use an optical system optimally designed to exhibit the characteristics of the image pickup device used. Therefore, many of them are designed by giving full consideration to the above-described problems associated with the use of an image pickup device.

On the other hand, it is known that as the area of the image pickup device decreases, the focal length of the optical system becomes shorter, and the optical depth of field becomes greater, giving rise to problems which are unlikely to occur in the case of taking silver halide photographs using a 35-mm film or the like.

For example, even when it is intended to take a picture in which a person is imaged large and sharply in an unsharp background as in portrait photography, such a phenomenon may occur that the background does not become unsharp as intended, or dust or falling snow or the like between the subject and the photographer which the photographer does not recognize is clearly imaged undesirably by photography using an electronic flash.

To solve these problems, it is conceivable to use an optical system with a small F-number or to lengthen the focal length to thereby reduce the depth of field. However, with the former method, the optical system becomes large in size, and the number of lens elements constituting the optical system increases, causing the cost to increase. With the latter method, because the photographing field angle changes, there are cases where the photographer's intended composition of a picture cannot be obtained. Accordingly, even if image quality comparable to that of silver halide photographs is attained in terms of resolution, color reproduction, etc., it is impossible to obtain photographic effects equivalent to those which are available for silver halide photographs.

Thus, it is impossible with the prior art to attain an image pickup apparatus capable of producing high-quality images comparable to silver halide photographs and providing photographic effects substantially equivalent to those which are available at the time of taking silver halide photographs and also capable of achieving reductions in both size and cost.

SUMMARY OF THE INVENTION

In view of the above-described problems associated with the prior art, an object of the present invention is to provide a compact and low-cost image pickup apparatus capable of providing high-quality images comparable to silver halide photographs and also capable of obtaining photographic effects equivalent to those which are available for silver halide photographs, e.g. utilization of blurring.

To attain the above-described object, the present invention provides an image pickup apparatus wherein an image of an object produced by an optical system is formed on an electronic image pickup device, thereby obtaining image information concerning the object. The image pickup device is a device having a matrix or mosaic color filter array provided over a photoelectric conversion surface, and the electronic image pickup device and the optical system satisfy the following conditions:

$$6.2/\sqrt{N} < P < 21/\sqrt{N} \qquad (1)$$

$$3.8 < N < 20 \qquad (2)$$

$$3.4 \times P - 25 < N < 20 \qquad (3)$$

$$0 < \theta < 1.3 \times P + 4 \qquad (4)$$

where P is the pixel pitch (given in micrometers) of the image pickup device; N is the number of pixels (given in million) of the image pickup device; and θ is the angle (°) at which the central ray of a light beam exiting from the optical system or a ray passing through the center of a stop is incident on the image pickup device at the maximum image height.

In this case, it is preferable to satisfy the following condition:

$$7.6/\sqrt{N} < P < 18/\sqrt{N} \qquad (5)$$

It is also preferable to satisfy the following condition:

$$5.0 < N < 20 \qquad (6)$$

It is also preferable to satisfy the following condition:

$$0 < P + 4 \qquad (7)$$

It is also preferable for the optical system to have a detachable structure.

In addition, the present invention provides an image pickup apparatus system including an electronic image pickup device that has a matrix or mosaic color filter array provided over a photoelectric conversion surface and that satisfies the above conditions (1) to (3). A plurality of optical systems are prepared to form an image of an object on the electronic image pickup device. The optical systems satisfy the above condition (4).

The reasons for adopting the above-described arrangements in the present invention, together with the functions thereof, will be described below.

Assuming that the standard angular resolution of the human eye is 1' (corresponding to the visual acuity 1.0), because this is a value that provides the critical resolution, resolution at which a line-and-space pattern contained in an image can be recognized as a sharp image is considered to be lower (larger in angle) than the above-described angular resolution.

For example, if the solid angle of the resolution is assumed to be about 1.67' (corresponding to the visual acuity 0.6), when an image is observed from a position 40 centimeters away from it, for example, it can be recognized as a sharp image down to a size of 0.194 millimeters.

When a print of A4 size (210 mm×297 mm) is observed from a position 40 centimeters away from it, the number of pixels required in the above-described case is about 1,100× 1,500=1,650,000 pixels. Considering that a margin of about 10 millimeters is left at each of the peripheral edges of the print, the number of pixels required is about 1,400,000 pixels.

Basically, numerical values hereinafter presented are determined on the assumption that a print of A4 size is observed from a position 40 centimeters away from it. When there is a linear relationship between the print size and the viewing distance, the number of pixels obtained does not depend on the print size. In general, however, as the print size decreases, the viewing distance tends to increase in comparison to the print size. Therefore, in the case of a small print size, e.g. A6 size (105 mm×149 mm), a smaller number of pixels than the presented number of pixels will suffice. In other words, in the present invention, an image that can be satisfactorily enlarged to a print size of the order of 8×10" size or larger is regarded as a high-quality image comparable to silver halide photographs.

Incidentally, in the case of an image produced by using an image pickup device, pixel units that constitute the image are fixed naturally. Therefore, it is impossible to express an object having a spatial frequency higher than the pixel units. When a test chart having pattern portions with various spatial frequencies is photographed, patterns whose narrowest line width is equal to the pixel pitch are all observed entirely resolved. However, in the case of patterns having a spatial frequency higher than the pixel units, in which the line width is less than the pixel pitch and the narrowest line width is, for example, ½ of the pixel pitch, only low-frequency light and dark patterns, i.e. moire, can be observed.

In the case of an image with the number of pixels obtained by the above-described calculation, the smallest pixel units of the print can be clearly recognized by man with high contrast. Accordingly, when the results of the above-described test chart observation are extended to apply to an ordinary image, the image appears sharp up to a certain spatial frequency, but it rapidly becomes impossible to resolve image components having spatial frequencies higher than the smallest pixel units. Therefore, although the contrast of the image is high, the image is poor in gradation representation and appears rough.

To obtain an image of abundant gradation, it is necessary to represent spatial frequencies up to one close to the resolution limit for the human perception.

In this regard, we have already disclosed that it is necessary in order to obtain image quality comparable to that of silver halide photographs to use pixel units corresponding to a solid angle of at least 1.25' (visual acuity 0.8), and about 2,500,000 pixels are needed when a margin of about 10 millimeters is left for A4 size.

However, the above numerical value corresponds to the full-size print, in which the whole photographed image is printed. If the ease of use comparable to that of silver halide photographs is taken into consideration, some cropping will be needed. To obtain the same image quality after cropping, the same number of pixels will be needed after cropping. For example, to effect cropping so as to double the size of an image, four times as many as the original number of pixels is needed because, in terms of area, one fourth of the image is to be printed over an area of the same size as the original image. However, it is well recognized that even in the case of silver halide photographs, the image quality is degraded by cropping. Therefore, there are a few cases where cropping is done to such an extent as to double the size of the original image. In addition, it is possible to permit some deterioration of image quality caused by image processing, e.g. interpolation. As a consequence of examining these facts together, we found that if the original image is made up of pixel units corresponding to a solid angle of the order of 1', it is possible to effect cropping within the normal range without causing a problem.

When the solid angle of 1' is converted into a number of pixels by a calculation similar to the above, it is about 3.8 million pixels when a margin of 10 millimeters is left at each of the peripheral edges of a print of A4 size.

The above-described condition is expressed by the lower limit of the following condition (2).

$$3.8 < N < 20 \quad (2)$$

where N is the number of pixels (given in million) of the image pickup device.

The upper limit of the condition (2), i.e. 20, is determined by taking into consideration the fact that as the number of pixels increases, the image reading speed and the recording speed to a recording medium become excessively low. The upper limit value of the condition (2) corresponds to the above-described solid angle of 0.0513' (visual acuity 2.3), which is determined by taking into consideration the number of pixels necessary to effect cropping to double the size of the original image or more and also taking into consideration the fact that at the upper limit value, even if the image is enlarged to A3 or larger, for example, and thus the viewing distance becomes short in comparison to the print size, the observer cannot practically recognize deterioration of the image quality.

To produce an image pickup device having the above-described number of pixels, it is desirable to satisfy the following condition (1):

$$6.2/\sqrt{N} < P < 21/\sqrt{N} \quad (1)$$

where P is the pixel pitch (given in micrometers) of the image pickup device.

The upper limit of the condition (1), i.e. $21/\sqrt{N}$, is set by taking into consideration the cost of the image pickup apparatus. If P is not smaller than the upper limit value, the size of the image pickup device becomes large in order to satisfy the number of pixels defined by the condition (2). Consequently, the number of devices obtained from one wafer decreases, causing an increase in cost. If P is not larger than the lower limit value of the condition (1), i.e. $6.2/\sqrt{N}$, even if the number of pixels is larger than the lower limit value of the condition (1), the diagonal length of the image pickup range becomes less than 9 millimeters, and the focal length of the optical system becomes short. Accordingly, it is impossible to solve the above-described problem that the depth of field becomes unfavorably great.

It is generally known that the number of defective pixels with respect to the total number of pixels of an image pickup device is proportional to the area of the image pickup device. Accordingly, as the area of the image pickup device increases, the production yield reduces. Even if the yield is constant, because the cost of an image pickup device is determined by the number of devices obtained from one wafer, the production cost of the image pickup device is supposed to increase as the area of the image pickup device increases.

From the user's standpoint, not the area of the image pickup device but the image quality is valuable. Accordingly, an image pickup apparatus whose cost is high in comparison to the number of pixels is unfavorable. In view of these circumstances, we examined the allowable number of pixels and area of the image pickup device and, as a result, found it desirable to satisfy the following condition:

$$3.4 \times P - 25 < N < 20 \quad (3)$$

If N is not larger than the lower limit value of the condition (3), i.e. $3.4 \times P - 25$, the number of pixels becomes small despite the large area of the image pickup device. Consequently, the cost-performance lowers. The upper limit value is the same as the upper limit value of the condition (2).

As has been stated above, it is desirable for a compact and low-cost image pickup apparatus to use an image pickup device having color filter elements arrayed in a matrix over a photoelectric conversion surface to construct a color image. In this case, it is desirable from the viewpoint of accurately obtaining color information that the angle at which light exiting from the optical system is incident on the image pickup device, particularly the incident angle of the principal ray, should be minimized.

To widen the allowable range of the angle of incidence on the image pickup device, it is conceivable to employ a technique whereby a light-blocking portion is provided around each of photoelectric conversion surface regions associated with the filter elements to prevent light passing through a neighboring filter element from reaching the photoelectric conversion surface region associated with the filter element concerned. If the ratio of the light-blocking portion to the pixel pitch is increased, the allowable range of the angle of incidence on the image pickup device further widens.

However, if the condition (1) or (3) is satisfied to ensure image quality comparable to that of silver halide photographs at reduced cost and the ratio of the light-blocking portion to the pixel pitch is increased, the area of the photoelectric conversion surface reduces. Consequently, the sensitivity lowers, and the S/N ratio deteriorates.

Considering the contribution of the optical system and the image pickup device to the image quality and size and the cost comprehensively, it is desirable that the angle at which the principal ray from the optical system is incident on the image pickup device should satisfy the following condition:

$$0 < \theta < 1.3 \times P + 4 \quad (4)$$

where $\theta$ is the angle (°) at which the principal ray exiting from the optical system is incident on the image pickup device at the maximum image height.

If $\theta$ is not smaller than the upper limit of the condition (4), i.e. $1.3 \times P + 4$, the rate at which light passing through a neighboring color filter element reaches the photoelectric conversion surface region associated with the filter element concerned increases unless the proportion of the above-described light-blocking portion is increased, and it becomes difficult to effect correction with a shading correction circuit.

As has been stated above, in a case where interference filters utilizing a dielectric multilayer film are used as color filters, an infrared cutoff filter, etc., spectral characteristics vary according to the incident angle of rays. Therefore, it is desirable that not only the principal ray but also a light beam converging on each point in the image circle should be in a state close to that in the center of the image plane.

Assuming that the present invention may be applied to an apparatus that does not reduce the-aperture to such an extent that light exiting from the optical system can be regarded as consisting substantially of only the principal ray, the incident angle $\theta$ in the condition (4) is not always the incident angle of the principal ray but may be the incident angle of the central ray of the light beam.

To allow the image pickup apparatus according to the present invention to provide an image of higher quality, it is preferable to further reduce the pixel units of the image. In this case, it is preferable to satisfy the following condition:

$$5.0 < N < 20 \quad (6)$$

To achieve a further reduction in cost, it is preferable to further reduce the size of the image pickup device. To utilize the effect of blurring at the time of taking a photograph, it is preferable to further increase the size of the image pickup device. Accordingly, it is preferable to satisfy the following condition (5):

$$7.6/\sqrt{N} < P < 18/\sqrt{N} \quad (5)$$

To further improve the accuracy of color information, it is preferable to satisfy the following condition (7):

$$\theta < P + 4 \quad (7)$$

In the image pickup apparatus according to the present invention, the optical system may be integrated with the apparatus. However, to make the apparatus conformable to photographic conditions suitable for various subjects, it is preferable for the optical system to have a detachable structure. Designing an optical system having such a structure and optimized for photographic conditions makes it possible to provide an optimum arrangement in terms of both size and cost.

In this case, the image pickup apparatus according to the present invention may be arranged in the form of an image pickup system. The image pickup system preferably includes an electronic image pickup device having a matrix or mosaic color filter array provided over a photoelectric conversion surface and satisfying the above conditions (1) to (3). A plurality of optical systems prepared to form an image of an object on the electronic image pickup device preferably satisfy the above condition (4).

To achieve both a further reduction in cost of the image pickup device and a photographic effect utilizing blurring comparable to that used for silver halide photographs, it is preferable to satisfy the following condition:

$$10.4/\sqrt{N} < P < 16/\sqrt{N} \quad (8)$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3 is an aberrational diagram illustrating aberrations produced at the wide-angle end of the zoom lens system in Example 1.

FIG. 4 is an aberrational diagram illustrating aberrations produced at the standard position of the zoom lens system in Example 1.

FIG. 5 is an aberrational diagram illustrating aberrations produced at the telephoto end of the zoom lens system in Example 1.

FIG. 7 is an aberrational diagram illustrating aberrations produced at the wide-angle end of the zoom lens system in Example 2.

FIG. 8 is an aberrational diagram illustrating aberrations produced at the standard position of the zoom lens system in Example 2.

FIG. 9 is an aberrational diagram illustrating aberrations produced at the telephoto end of the zoom lens system in Example 2.

FIG. 11 is an aberrational diagram illustrating aberrations produced at the wide-angle end of the zoom lens system in Example 3.

FIG. 12 is an aberrational diagram illustrating aberrations produced at the standard position of the zoom lens system in Example 3.

FIG. 13 is an aberrational diagram illustrating aberrations produced at the telephoto end of the zoom lens system in Example 3.

DESCRIPTION OF THE PREFERRED EMBODIMENTS

Examples of the image pickup apparatus according to the present invention will be described below.

Figure 1:
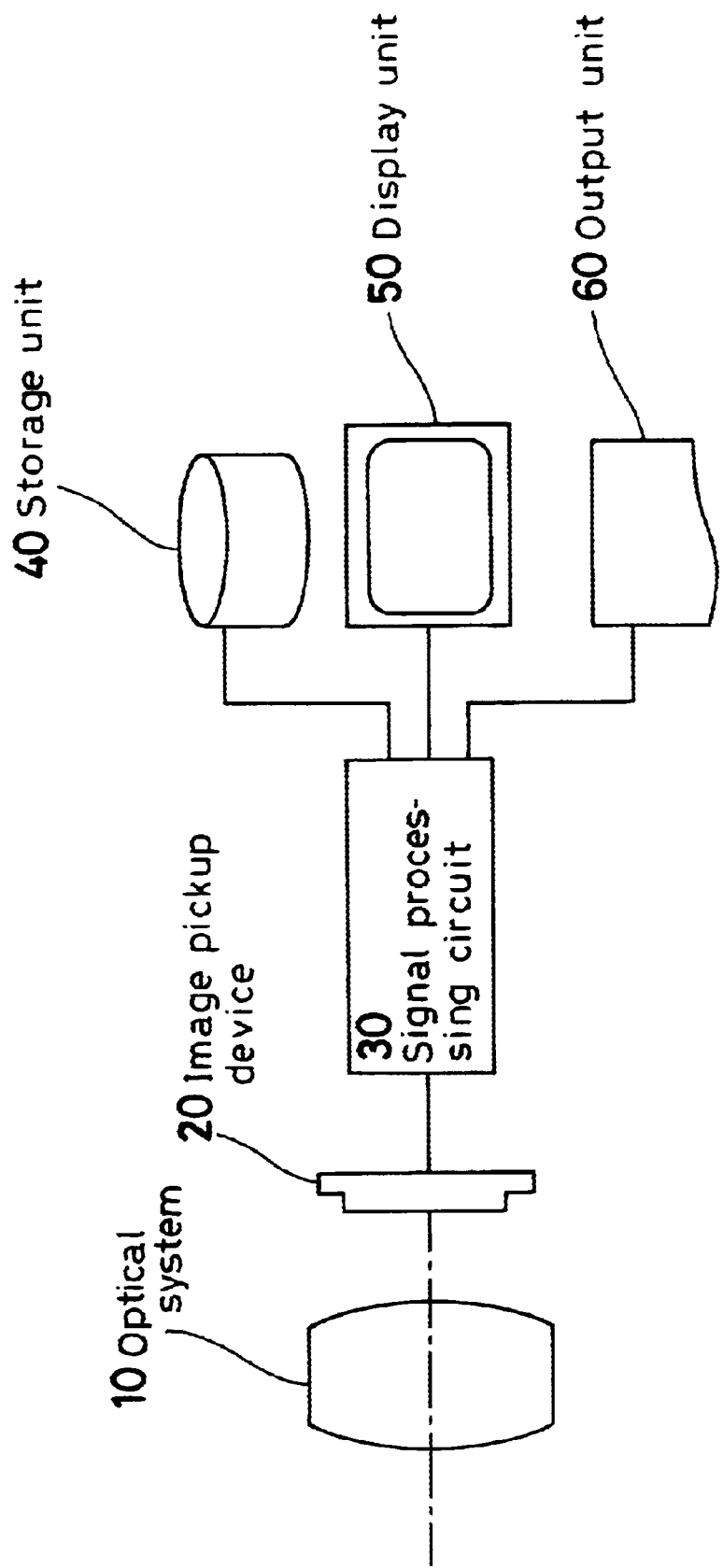
FIG. 1 is a diagram showing the whole arrangement of the image pickup apparatus according to the present invention.

The whole arrangement of the image pickup apparatus according to the present invention is shown in FIG. 1. As shown in the figure, the image pickup apparatus includes an optical system 10 for forming an image of an object, an image pickup device 20, e.g. a CCD or a CMOS, placed at the image-formation position of the optical system 10, a signal processing circuit 30 for processing an image signal obtained with the image pickup device 20, a storage unit 40 connected to the signal processing circuit 30 to store the obtained image data, a display unit 50 connected to the signal processing circuit 30 to display the obtained image, and an output unit 60, e.g. a printer, which outputs the obtained image.

The following is a description of examples regarding mainly a lens system used as the optical system 10 and the image pickup device 20 used in accordance with the lens system.

EXAMPLE 1

In this example, a zoom lens system having a zoom ratio of 3 is used as the optical system 10. An image pickup device used as the image pickup device 20 is as follows: The device size is ⅔ inch (image pickup part: 6.6 mm×8.8 mm); the number of pixels is 2,121×2,828=5,998,000 pixels; and the pixel pitch P is 3.1 micrometers.

Figure 2:
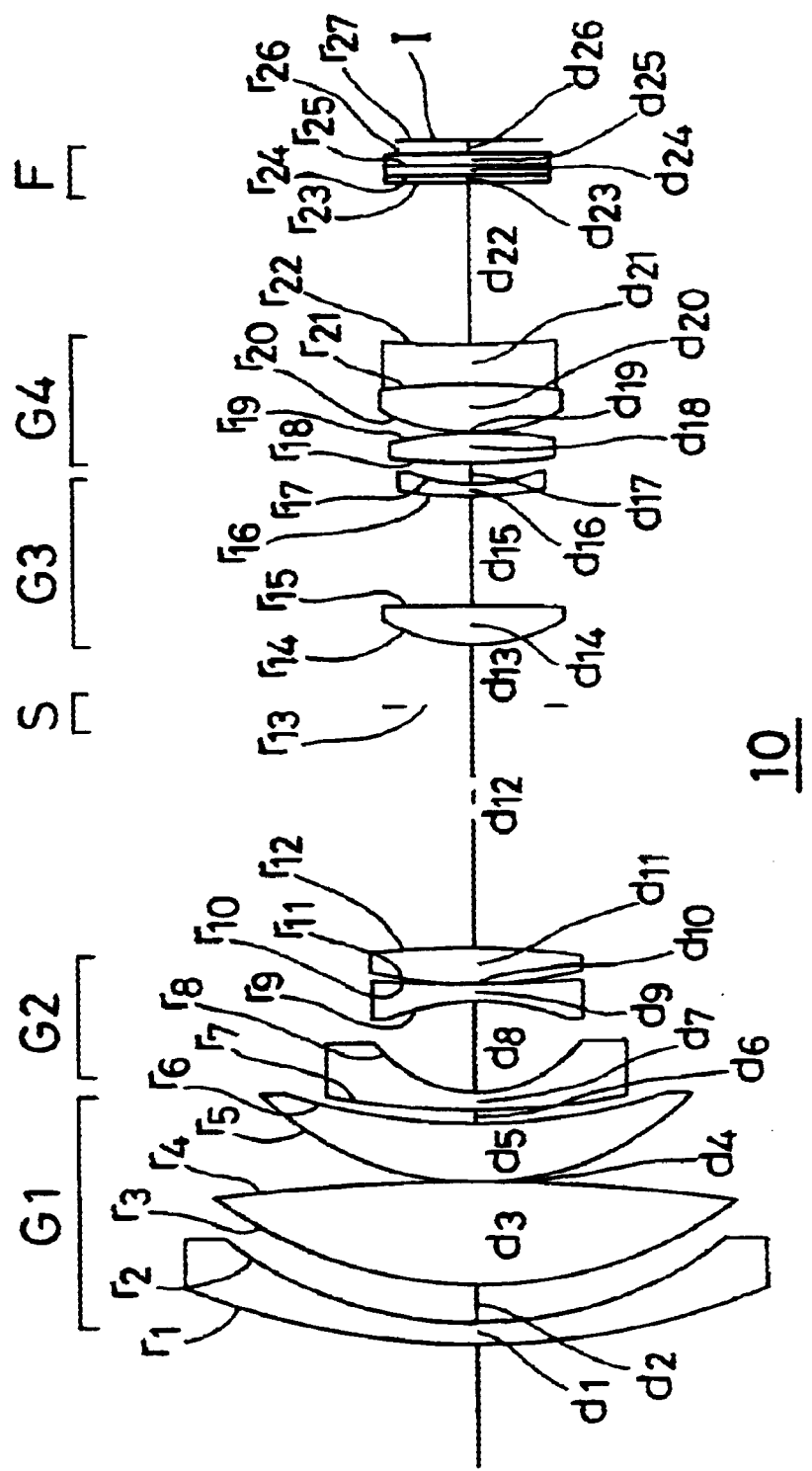
FIG. 2 is a sectional view of a zoom lens system constituting an optical system in Example 1 of the present invention, showing the zoom lens system at the wide-angle end.

FIG. 2 is a sectional view of the lens system that constitutes the optical system 10, showing the lens system at the wide-angle end. As shown in the figure, the lens system includes, in order from the object side, a first lens unit G1, a second lens unit G2, a stop S, a third lens unit G3, and a fourth lens unit G4. The first lens unit G1 has three lenses, i.e. a negative meniscus lens having a convex surface directed toward the object side, a biconvex lens, and a positive meniscus lens having a convex surface directed toward the object side. The second lens unit G2 has three lenses, i.e. a negative meniscus lens having a convex surface directed toward the object side, a biconcave lens, and a biconvex lens. The third lens unit G3 has two lenses, i.e. a biconvex lens having a surface of stronger power directed toward the object side, and a negative meniscus lens having a convex surface directed toward the object side. The fourth lens unit G4 has three lenses, i.e. a biconvex lens, and a cemented lens consisting of a biconvex lens and a biconcave lens. During zooming from the wide-angle end to the telephoto end, the first lens unit G1 and the stop S are fixed. The second lens unit G2 moves from the object side toward the image side. The third lens unit G3 and the fourth lens unit G4 move toward the object side while widening the spacing therebetween. A plane-parallel plate F, which constitutes a cover glass and filters for the image pickup device 20, is placed between the lens system and the image plane I.

Numerical data concerning this lens system will be shown later. An aspherical surface is used for the surface of the second lens unit G2 that is closest to the object side, and another aspherical surface is used for the surface of the third lens unit G3 that is closest to the object side. Aberrations in this example at the wide-angle end are shown in FIG. 3. Aberrations at the standard position are shown in FIG. 4. Aberrations at the telephoto end are shown in FIG. 5. In the aberrational diagrams, SA denotes spherical aberration; AS denotes astigmatism; DT denotes distortion; and CC denotes lateral chromatic aberration (the same shall apply in the following aberrational diagrams). In the diagrams, "FIY" denotes the image height.

In Example 1, the values concerning the conditions (1) to (3) are as follows: P=3.1 micrometers, and N=6.0. The value concerning the condition (4) is $\theta=3.5°$ (at the wide-angle end), $\theta=3.6°$ (at the standard position), and $\theta=4.5°$ (at the telephoto end). Thus, Example 1 satisfies all the conditions. Accordingly, it is possible to obtain a compact and low-cost image pickup apparatus capable of obtaining a high-quality image comparable to silver halide photographs and also capable of making use of photographic effects equivalent to those which are available for silver halide photographs, e.g. utilization of blurring.

EXAMPLE 2

In this example, a zoom lens system having a zoom ratio of 3 is used as the optical system 10. An image pickup device used as the image pickup device 20 is as follows: The device size is approximately ⅘ inch (image pickup part: 12 mm×18 mm); the number of pixels is 2,121×3,182=6,749,000 pixels; and the pixel pitch P is 5.7 micrometers.

Figure 6:
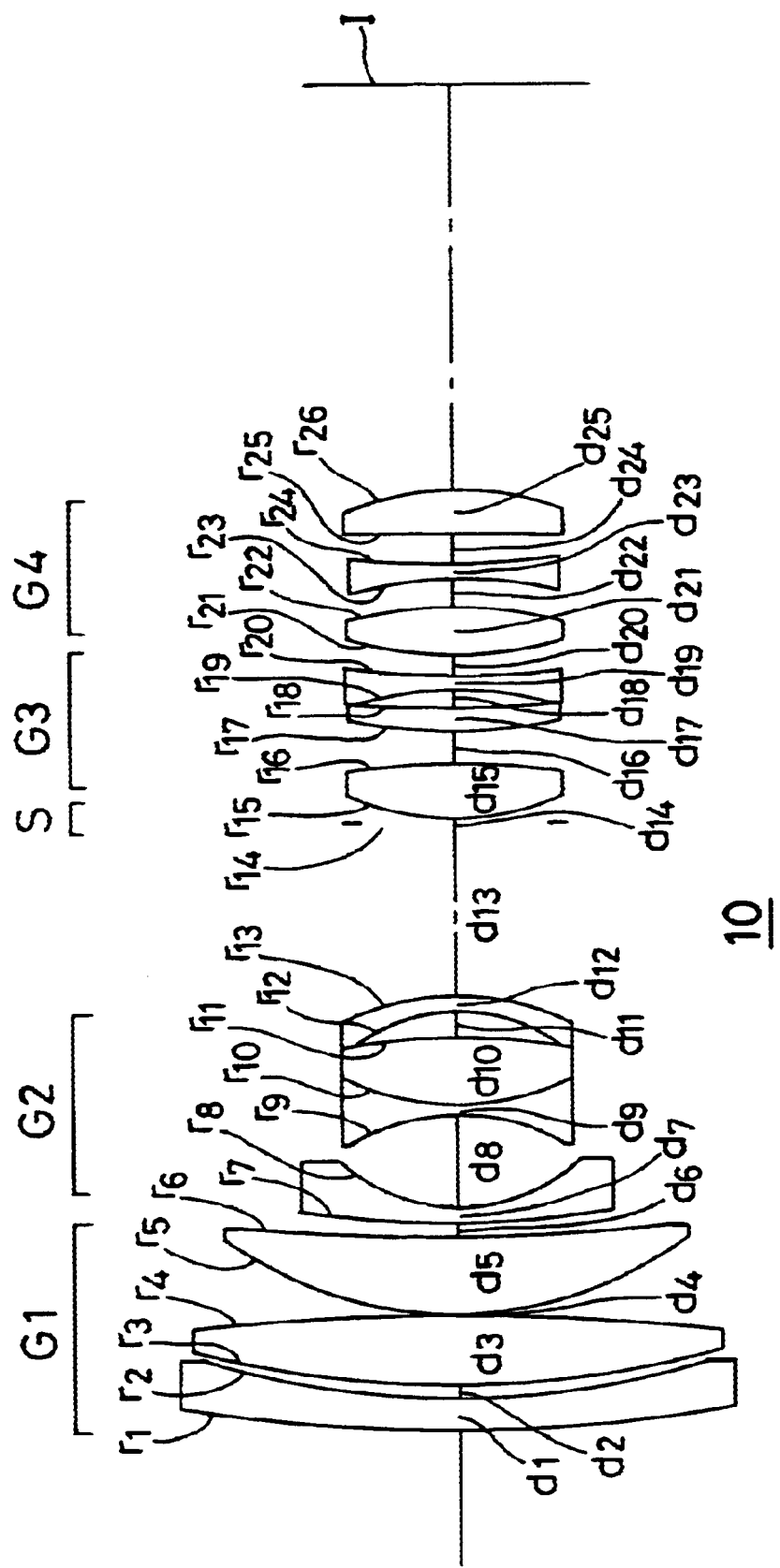
FIG. 6 is a sectional view of a zoom lens system constituting an optical system in Example 2 of the present invention, showing the zoom lens system at the wide-angle end.

FIG. 6 is a sectional view of the lens system that constitutes the optical system 10, showing the lens system at the wide-angle end. As shown in the figure, the lens system includes, in order from the object side, a first lens unit G1, a second lens unit G2, a stop S, a third lens unit G3, and a fourth lens unit G4. The first lens unit G1 has three lenses, i.e. a negative meniscus lens having a convex surface directed toward the object side, a biconvex lens, and a positive meniscus lens having a convex surface directed toward the object side. The second lens unit G2 has four lenses, i.e. a negative meniscus lens having a convex surface directed toward the object side, a cemented lens consisting of a biconcave lens and a biconvex lens, and a negative meniscus lens having a convex surface directed toward the image side. The third lens unit G3 has three lenses, i.e. a biconvex lens having a surface of stronger power directed toward the object side, a positive meniscus lens having a convex surface directed toward the object side, and a biconcave lens. The fourth lens unit G4 has three lenses, i.e. a biconvex lens, a biconcave lens, and a positive meniscus lens having a convex surface directed toward the image side. During zooming from the wide-angle end to the telephoto end, the first lens unit G1 and the second lens unit G2 move toward the object side while widening the spacing therebetween. The second lens unit G2, the third lens unit G3 and the fourth lens unit G4 move toward the object side while narrowing the spacings therebetween. Numerical data concerning this lens system will be shown later. An aspherical surface is used for the surface of the second lens unit G2 that is closest to the object side, and another aspherical surface is used for the object-side surface of the second lens in the third lens unit G3. Another aspherical surface is used for the image-side surface of the second lens in the fourth lens unit G4. Aberrations in this example at the wide-angle end are shown in FIG. 7. Aberrations at the standard position are shown in FIG. 8. Aberrations at the telephoto end are shown in FIG. 9.

In Example 2, the values concerning the conditions (1) to (3) are as follows: P=5.7 micrometers, and N=6.7. The value concerning the condition (4) is θ=9.7° (at the wide-angle end), θ=8.7° (at the standard position), and θ=7.6° (at the telephoto end). Thus, Example 2 satisfies all the conditions. Accordingly, it is possible to obtain a compact and low-cost image pickup apparatus capable of obtaining a high-quality image comparable to silver halide photographs and also capable of making use of photographic effects equivalent to those which are available for silver halide photographs, e.g. utilization of blurring.

EXAMPLE 3

In this example, a zoom lens system having a zoom ratio of 10 is used as the optical system 10. An image pickup device used as the image pickup device 20 is as follows: The device size is approximately ⅓ inch (image pickup part: 12 mm×18 mm); the number of pixels is 2,666×4,000=10,664,000 pixels; and the pixel pitch P is 4.5 micrometers.

Figure 10:
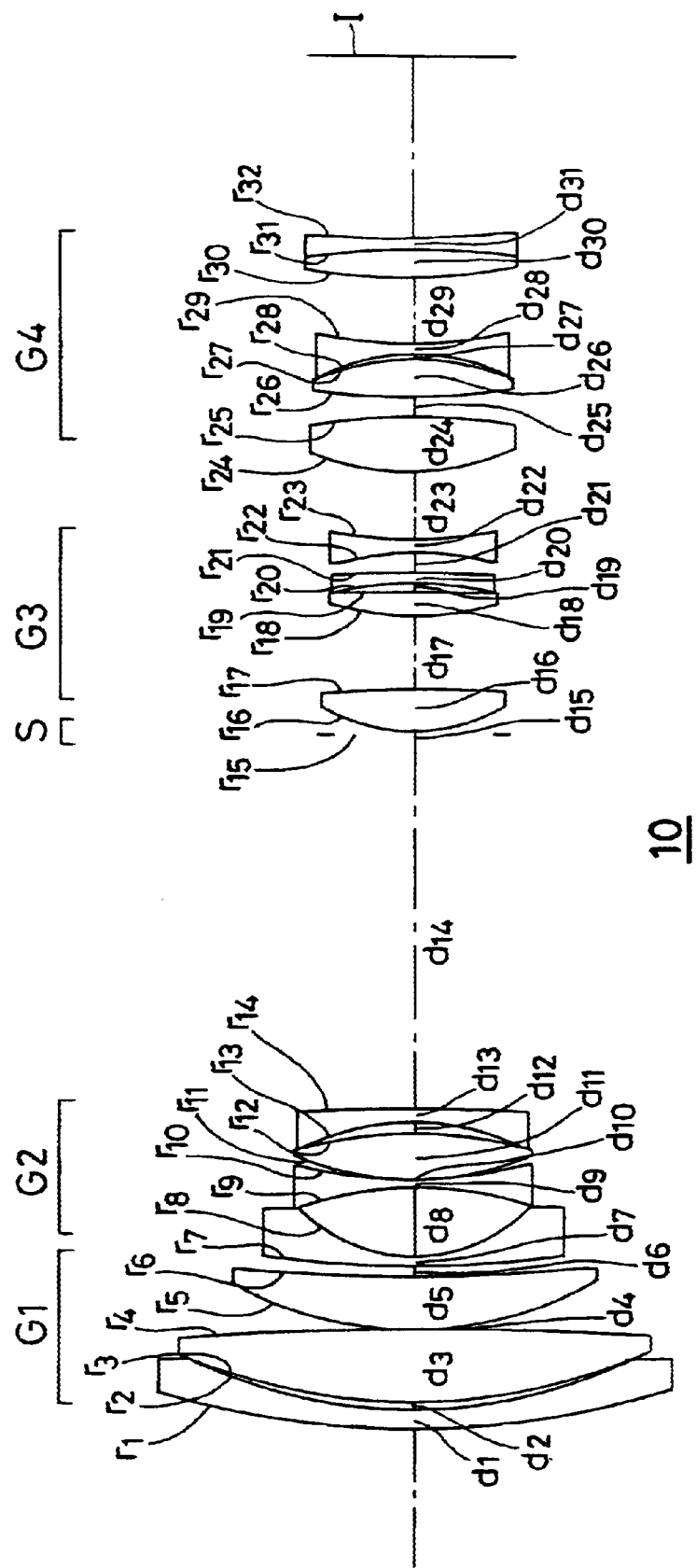
FIG. 10 is a sectional view of a zoom lens system constituting an optical system in Example 3 of the present invention, showing the zoom lens system at the wide-angle end.

FIG. 10 is a sectional view of the zoom lens system that constitutes the optical system 10, showing the zoom lens system at the wide-angle end. As shown in the figure, the zoom lens system includes, in order from the object side, a first lens unit G1, a second lens unit G2, a stop S, a third lens unit G3, and a fourth lens unit G4. The first lens unit G1 has three lenses, i.e. a negative meniscus lens having a convex surface directed toward the object side, a biconvex lens, and a positive meniscus lens having a convex surface directed toward the object side. The second lens unit G2 has four lenses, i.e. a negative meniscus lens having a convex surface directed toward the object side, a biconcave lens, a biconvex lens, and a negative meniscus lens having a convex surface directed toward the image side. The third lens unit G3 has four lenses, i.e. two biconvex lenses each having a surface of stronger power directed toward the object side, a negative meniscus lens having a convex surface directed toward the image side, and a biconcave lens. The fourth lens unit G4 has five lenses, i.e. two biconvex lenses, a biconcave lens, and a cemented lens consisting of a biconvex lens and a biconcave lens. During zooming from the wide-angle end to the telephoto end, the second lens unit G2 moves along a locus that is convex toward the image side. The first lens unit G1, the third lens unit G3 and the fourth lens unit G4 move toward the object side while narrowing the spacings therebetween. Numerical data concerning this lens system will be shown later. An aspherical surface is used for the surface of the second lens unit G2 that is closest to the object side, and another aspherical surface is used for the object-side surface of the second lens in the third lens unit G3. Another aspherical surface is used for the image-side surface of the third lens in the fourth lens unit G4. Aberrations in this example at the wide-angle end are shown in FIG. 11. Aberrations at the standard position are shown in FIG. 12. Aberrations at the telephoto end are shown in FIG. 13.

In Example 3, the values concerning the conditions (1) to (3) are as follows: P=4.5 micrometers, and N=10.7. The value concerning the condition (4) is θ=6.0° (at the wide-angle end), θ=6.0° (at the standard position), and θ=5.4° (at the telephoto end). Thus, Example 3 satisfies all the conditions. Accordingly, it is possible to obtain a compact and low-cost image pickup apparatus capable of obtaining a high-quality image comparable to silver halide photographs and also capable of making use of photographic effects equivalent to those which are available for silver halide photographs, e.g. utilization of blurring.

Numerical data concerning the optical system 10 in each of the above-described examples will be shown below. In the following: reference character f denotes the focal length of the entire system; $F_{NO}$ is F-number; $2\omega$ is the field angle; $f_B$ is the back focus; $r_1, r_2$ ... are the radii of curvature of lens surfaces; $d_1, d_2$ ... are the spacings between adjacent lens surfaces; $n_{d1}, n_{d2}$ ... are the refractive indices of the lenses for the d-line; and $v_{d1}, v_{d2}$ ... are the Abbe's numbers of the lenses. Assuming that z is taken in the direction of the optical axis, where the direction of travel of light is defined as a positive direction, and y is the distance from the optical axis in a direction perpendicular to the optical axis, an aspherical configuration is expressed by $$z=(y^2/r)/[1+\{1-(K+1)(y/r)^2\}^{1/2}]+A_4y^4+A_6y^6+A_8y^8+A_{10}y^{10}$$

where r is a paraxial curvature radius; K is a conic coefficient; and $A_4$, $A_6$, $A_8$ and $A_{10}$ are 4th-, 6th-, 8th- and 10th-order aspherical coefficients, respectively.

Example 1 f = 9.54 ~ 16.81 ~ 27.99
$F_{NO}$ = 2.07 ~ 2.50 ~ 2.99
$2_\omega$ = 59.73° ~ 36.47° ~ 22.76°

| | | | |
|---|---|---|---|
| $r_1$ = 53.6051 | $d_1$ = 2.0000 | $n_{d1}$ = 1.72825 | $v_{d1}$ = 28.46 |
| $r_2$ = 29.5202 | $d_2$ = 2.4740 | | |
| $r_3$ = 30.6986 | $d_3$ = 7.9296 | $n_{d2}$ = 1.48749 | $v_{d2}$ = 70.23 |
| $r_4$ = −151.2076 | $d_4$ = 0.3000 | | |
| $r_5$ = 23.0776 | $d_5$ = 4.2147 | $n_{d3}$ = 1.48749 | $v_{d3}$ = 70.23 |
| $r_6$ = 53.5565 | $d_6$ = (Variable) | | |
| $r_7$ = 122.9534 (Aspheric) | $d_7$ = 1.2000 | $n_{d4}$ = 1.74100 | $v_{d4}$ = 52.64 |
| $r_8$ = 9.2118 | $d_8$ = 7.0697 | | |
| $r_9$ = −16.2954 | $d_9$ = 1.1000 | $n_{d5}$ = 1.62299 | $v_{d5}$ = 58.16 |
| $r_{10}$ = 72.0218 | $d_{10}$ = 0.1500 | | |
| $r_{11}$ = 35.5144 | $d_{11}$ = 2.5944 | $n_{d6}$ = 1.84666 | $v_{d6}$ = 23.78 |
| $r_{12}$ = −65.9904 | $d_{12}$ = (Variable) | | |
| $r_{13}$ = ∞ (Stop) | $d_{13}$ = (Variable) | | |
| $r_{14}$ = 12.3071 (Aspheric) | $d_{14}$ = 2.7945 | $n_{d7}$ = 1.48749 | $v_{d7}$ = 70.23 |
| $r_{15}$ = −1098.3117 | $d_{15}$ = 8.4624 | | |
| $r_{16}$ = 35.9276 | $d_{16}$ = 0.8000 | $n_{d8}$ = 1.76182 | $v_{d8}$ = 26.52 |
| $r_{17}$ = 12.6255 | $d_{17}$ = (Variable) | | |
| $r_{18}$ = 51.4623 | $d_{18}$ = 2.1957 | $n_{d9}$ = 1.48749 | $v_{d9}$ = 70.23 |
| $r_{19}$ = −29.7927 | $d_{19}$ = 0.1500 | | |
| $r_{20}$ = 15.1018 | $d_{20}$ = 3.6681 | $n_{d10}$ = 1.77250 | $v_{d10}$ = 49.60 |
| $r_{21}$ = −49.8781 | $d_{21}$ = 2.9257 | $n_{d11}$ = 1.84666 | $v_{d11}$ = 23.78 |
| $r_{22}$ = 64.2107 | $d_{22}$ = (Variable) | | |
| $r_{23}$ = ∞ | $d_{23}$ = 0.3888 | $n_{d12}$ = 1.51633 | $v_{d12}$ = 64.14 |
| $r_{24}$ = ∞ | $d_{24}$ = 0.8748 | $n_{d13}$ = 1.54771 | $v_{d13}$ = 62.84 |
| $r_{25}$ = ∞ | $d_{25}$ = 0.3888 | | |
| $r_{26}$ = ∞ | $d_{26}$ = 0.3645 | $n_{d14}$ = 1.51633 | $v_{d14}$ = 64.14 |
| $r_{27}$ = ∞ | | | |

Zooming Spaces

| f | 9.54 | 16.81 | 27.99 |
|---|---|---|---|
| $d_6$ | 1.0365 | 9.5551 | 16.3421 |
| $d_{12}$ | 18.4313 | 10.0496 | 5.2305 |
| $d_{13}$ | 4.5980 | 2.8515 | 0.9711 |
| $d_{17}$ | 1.5381 | 2.1864 | 2.3168 |
| $d_{22}$ | 12.2409 | 14.5442 | 15.8056 |

Aspherical Coefficients 7 th surface
K = 0.00000
$A_4$ = 3.72514 × 10$^{-5}$

-continued $A_6 = -1.23010 \times 10^{-7}$
$A_8 = 1.00234 \times 10^{-10}$
$A_{10} = -5.04667 \times 10^{-14}$
14 th surface
$K = -0.55584$
$A_4 = -2.90823 \times 10^{-5}$
$A_6 = 2.06079 \times 10^{-7}$
$A_8 = -3.83163 \times 10^{-9}$
$A_{10} = 1.71960 \times 10^{-11}$ Example 2

$f = 18.50 \sim 36.00 \sim 53.50$
$F_{NO} = 2.81 \sim 3.33 \sim 3.96$
$2\omega = 64.08° \sim 33.35° \sim 22.88°$
$f_B = 32.33 \sim 42.37 \sim 54.83$

| | | | |
|---|---|---|---|
| $r_1 = 142.7389$ | $d_1 = 2.3000$ | $n_{d1} = 1.84666$ | $\nu_{d1} = 23.78$ |
| $r_2 = 69.4007$ | $d_2 = 1.0000$ | | |
| $r_3 = 81.7830$ | $d_3 = 5.4044$ | $n_{d2} = 1.49700$ | $\nu_{d2} = 81.54$ |
| $r_4 = -240.7085$ | $d_4 = 0.1500$ | | |
| $r_5 = 31.5808$ | $d_5 = 6.6647$ | $n_{d3} = 1.48749$ | $\nu_{d3} = 70.23$ |
| $r_6 = 225.9348$ | $d_6 =$ (Variable) | | |
| $r_7 = 255.1775$ | $d_7 = 1.0000$ | $n_{d4} = 1.67790$ | $\nu_{d4} = 50.72$ |
| (Aspheric) | | | |
| $r_8 = 13.4766$ | $d_8 = 7.4169$ | | |
| $r_9 = -18.6935$ | $d_9 = 1.0000$ | $n_{d5} = 1.65100$ | $\nu_{d5} = 56.16$ |
| $r_{10} = 20.1134$ | $d_{10} = 5.5000$ | $n_{d6} = 1.76182$ | $\nu_{d6} = 26.52$ |
| $r_{11} = -41.7043$ | $d_{11} = 2.0936$ | | |
| $r_{12} = -13.6212$ | $d_{12} = 1.2000$ | $n_{d7} = 1.69680$ | $\nu_{d7} = 55.53$ |
| $r_{13} = -19.0972$ | $d_{13} =$ (Variable) | | |
| $r_{14} = \infty$ (Stop) | $d_{14} = 0.1500$ | | |
| $r_{15} = 18.3444$ | $d_{15} = 4.5000$ | $n_{d8} = 1.48749$ | $\nu_{d8} = 70.23$ |
| $r_{16} = -59.4498$ | $d_{16} = 2.6406$ | | |
| $r_{17} = 35.1360$ | $d_{17} = 1.8617$ | $n_{d9} = 1.48749$ | $\nu_{d9} = 70.23$ |
| (Aspheric) | | | |
| $r_{18} = 72.7417$ | $d_{18} = 1.4824$ | | |
| $r_{19} = -29.3130$ | $d_{19} = 1.2000$ | $n_{d10} = 1.72825$ | $\nu_{d10} = 28.46$ |
| $r_{20} = 82.3092$ | $d_{20} =$ (Variable) | | |
| $r_{21} = 29.1010$ | $d_{21} = 4.0000$ | $n_{d11} = 1.71299$ | $\nu_{d11} = 53.87$ |
| $r_{22} = -30.9717$ | $d_{22} = 2.3761$ | | |
| $r_{23} = -32.8057$ | $d_{23} = 1.2000$ | $n_{d12} = 1.83400$ | $\nu_{d12} = 37.16$ |
| $r_{24} = 296.9783$ | $d_{24} = 2.5266$ | | |
| (Aspheric) | | | |
| $r_{25} = -1240.3510$ | $d_{25} = 3.5000$ | $n_{d13} = 1.48749$ | $\nu_{d13} = 70.23$ |
| $r_{26} = -22.6039$ | | | |

Zooming Spaces

| f | 18.50 | 36.00 | 53.50 |
|---|---|---|---|
| $d_6$ | 1.0000 | 12.8541 | 15.3530 |
| $d_{13}$ | 14.1294 | 5.5434 | 0.6000 |
| $d_{20}$ | 1.5282 | 0.8171 | 0.2548 |

Aspherical Coefficients 7 th surface
$K = -1.00000$
$A_4 = 2.33900 \times 10^{-5}$
$A_6 = -2.85795 \times 10^{-8}$
$A_8 = 7.18675 \times 10^{-11}$
$A_{10} = 5.36999 \times 10^{-13}$
17 th surface
$K = -3.02773$
$A_4 = -1.03541 \times 10^{-5}$
$A_6 = -8.91353 \times 10^{-8}$
$A_8 = -4.85650 \times 10^{-10}$
$A_{10} = -1.89977 \times 10^{-12}$
24 th surface
$K = -8.00000$
$A_4 = 4.89123 \times 10^{-5}$
$A_6 = 4.14514 \times 10^{-8}$
$A_8 = -4.65015 \times 10^{-10}$
$A_{10} = 3.92644 \times 10^{-12}$ Example 3

$f = 18.50 \sim 58.50 \sim 174.99$
$F_{NO} = 2.82 \sim 4.39 \sim 5.64$
$2\omega = 64.63° \sim 21.21° \sim 7.13°$
$f_B = 20.27 \sim 53.61 \sim 73.25$

| | | | |
|---|---|---|---|
| $r_1 = 99.5174$ | $d_1 = 2.3000$ | $n_{d1} = 1.84666$ | $\nu_{d1} = 23.78$ |
| $r_2 = 63.0842$ | $d_2 = 0.5000$ | | |
| $r_3 = 64.5270$ | $d_3 = 8.1915$ | $n_{d2} = 1.49700$ | $\nu_{d2} = 81.54$ |
| $r_4 = -332.3172$ | $d_4 = 0.2000$ | | |
| $r_5 = 47.6076$ | $d_5 = 5.4456$ | $n_{d3} = 1.48749$ | $\nu_{d3} = 70.23$ |
| $r_6 = 199.1227$ | $d_6 =$ (Variable) | | |
| $r_7 = 256.1370$ | $d_7 = 1.0000$ | $n_{d4} = 1.74320$ | $\nu_{d4} = 49.34$ |
| (Aspheric) | | | |
| $r_8 = 18.9562$ | $d_8 = 7.4421$ | | |
| $r_9 = -38.4224$ | $d_9 = 1.0000$ | $n_{d5} = 1.69680$ | $\nu_{d5} = 55.53$ |
| $r_{10} = 57.1666$ | $d_{10} = 0.1500$ | | |
| $r_{11} = 42.7956$ | $d_{11} = 5.0110$ | $n_{d6} = 1.84666$ | $\nu_{d6} = 23.78$ |
| $r_{12} = -47.3345$ | $d_{12} = 1.3662$ | | |
| $r_{13} = -27.8501$ | $d_{13} = 1.2000$ | $n_{d7} = 1.69680$ | $\nu_{d7} = 55.53$ |
| $r_{14} = -227.3164$ | $d_{14} =$ (Variable) | | |
| $r_{15} = \infty$ (Stop) | $d_{15} = 0.1500$ | | |
| $r_{16} = 20.0903$ | $d_{16} = 4.6869$ | $n_{d8} = 1.49700$ | $\nu_{d8} = 81.54$ |
| $r_{17} = -244.8710$ | $d_{17} = 8.2941$ | | |
| $r_{18} = 30.0536$ | $d_{18} = 2.8213$ | $n_{d9} = 1.48749$ | $\nu_{d9} = 70.23$ |
| (Aspheric) | | | |
| $r_{19} = -276.4540$ | $d_{19} = 0.8582$ | | |
| $r_{20} = -43.3485$ | $d_{20} = 1.2000$ | $n_{d10} = 1.71700$ | $\nu_{d10} = 47.92$ |
| $r_{21} = -191.5603$ | $d_{21} = 2.4059$ | | |
| $r_{22} = -32.0379$ | $d_{22} = 1.2000$ | $n_{d11} = 1.72825$ | $\nu_{d11} = 28.46$ |
| $r_{23} = 53.5963$ | $d_{23} =$ (Variable) | | |
| $r_{24} = 26.4185$ | $d_{24} = 6.5000$ | $n_{d12} = 1.72000$ | $\nu_{d12} = 43.69$ |
| $r_{25} = -73.1340$ | $d_{15} = 2.0972$ | | |
| $r_{26} = 73.2866$ | $d_{16} = 4.2122$ | $n_{d13} = 1.49700$ | $\nu_{d13} = 81.54$ |
| $r_{27} = -28.2129$ | $d_{17} = 0.7581$ | | |
| $r_{28} = -23.8555$ | $d_{18} = 1.2000$ | $n_{d14} = 1.68893$ | $\nu_{d14} = 31.07$ |
| $r_{29} = 101.4890$ | $d_{19} = 7.3624$ | | |
| (Aspheric) | | | |
| $r_{30} = 71.8406$ | $d_{20} = 3.1036$ | $n_{d15} = 1.84666$ | $\nu_{d15} = 23.78$ |
| $r_{31} = -71.9073$ | $d_{21} = 1.2000$ | $n_{d16} = 1.78590$ | $\nu_{d16} = 44.20$ |
| $r_{32} = 208.9053$ | | | |

Zooming Spaces

| f | 18.50 | 58.50 | 174.99 |
|---|---|---|---|
| $d_6$ | 1.4612 | 13.6059 | 36.1316 |
| $d_{14}$ | 42.4839 | 12.8483 | 0.6000 |
| $d_{23}$ | 7.3029 | 2.4399 | 0.1500 |

Aspherical Coefficients 7 th surface
$K = -1.00000$
$A_4 = 3.76611 \times 10^{-6}$
$A_6 = 3.25326 \times 10^{-11}$
$A_8 = -1.70986 \times 10^{-11}$
$A_{10} = 4.20805 \times 10^{-14}$
18 th surface
$K = -1.78345$
$A_4 = -4.01049 \times 10^{-6}$
$A_6 = -5.54490 \times 10^{-8}$
$A_8 = -3.14396 \times 10^{-11}$
$A_{10} = -2.72846 \times 10^{-12}$
29 th surface
$K = 10.15460$
$A_4 = 2.77112 \times 10^{-5}$
$A_6 = 9.60025 \times 10^{-9}$
$A_8 = 1.57584 \times 10^{-10}$
$A_{10} = -1.10775 \times 10^{-12}$ Although the present invention has been described with regard mainly to a digital camera, it should be noted that the present invention is similarly applicable to a case where a still picture is viewed by using other image pickup apparatus (e.g. a digital video camera).

The above-described image pickup apparatus and image pickup apparatus system according to the present invention can be used in image pickup apparatuses, particularly in electronic cameras, video cameras, etc., in which an object image is formed, and the object image is received with an image pickup device, such as a CCD, to take a picture of the object. Embodiments in which the present invention is applied to such apparatuses will be described below.

Figure 14:
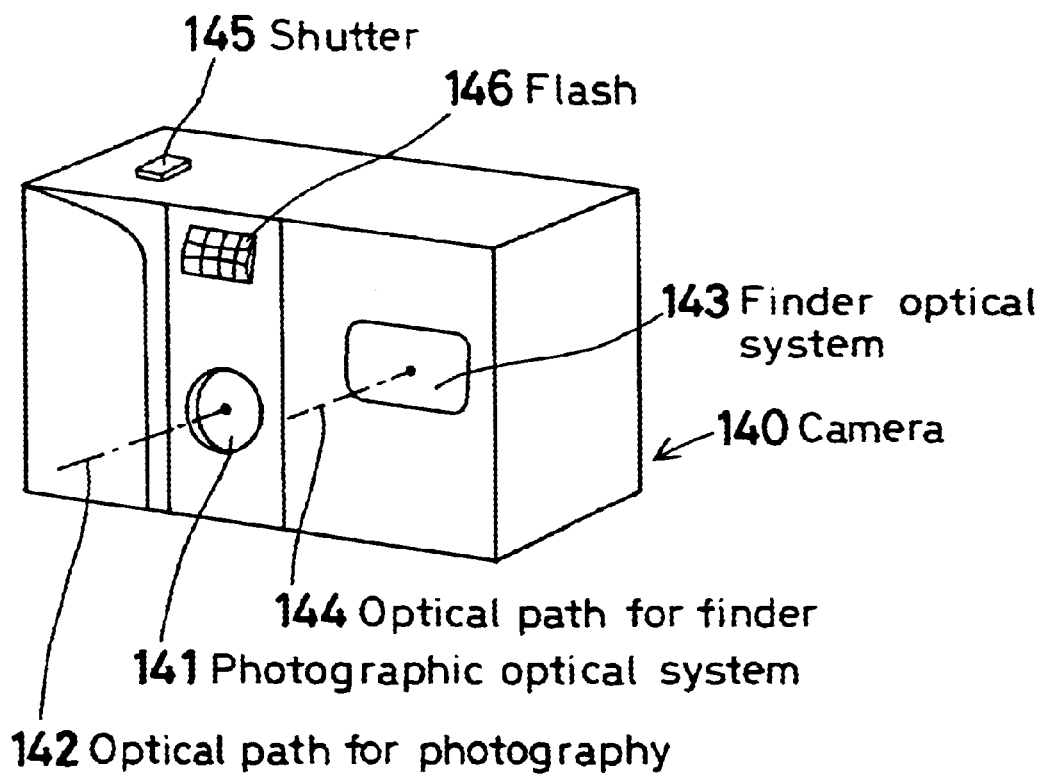
FIG. 14 is a perspective view showing the external appearance of an image pickup apparatus according to the present invention as arranged in the form of an electronic camera, as viewed from the front side thereof.
Figure 15:
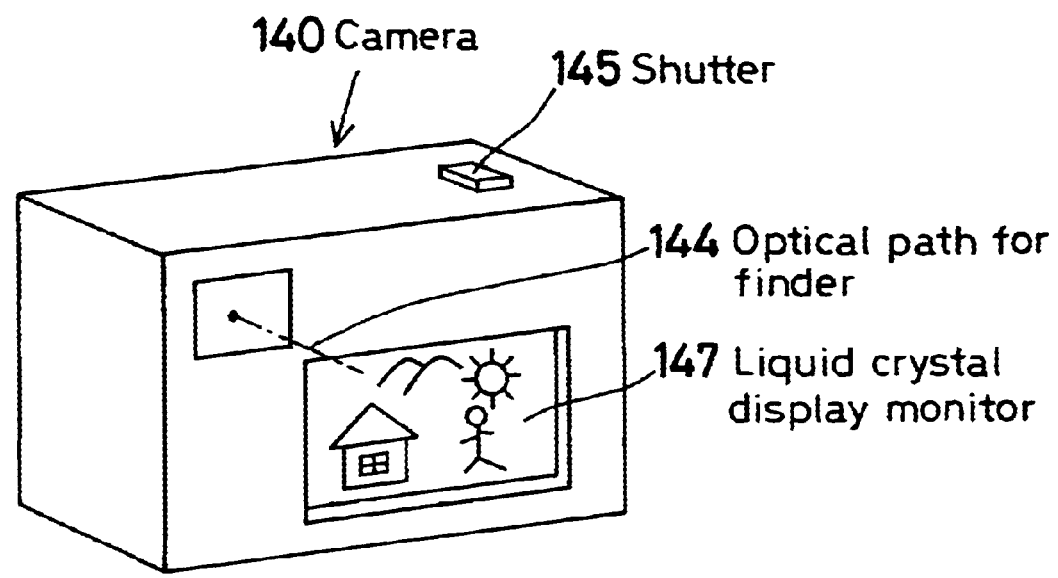
FIG. 15 is a perspective view of the electronic camera shown in FIG. 14, as viewed from the rear side thereof.
Figure 16:
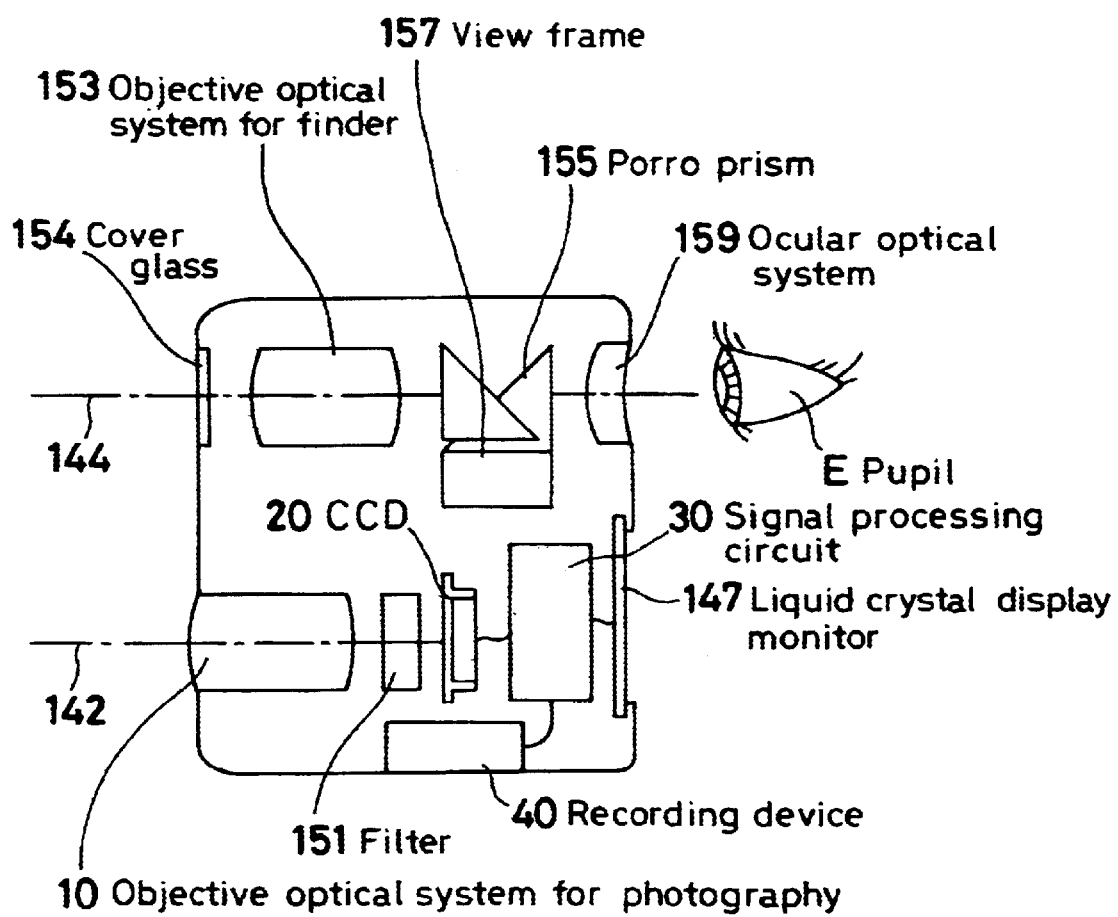
FIG. 16 is a sectional view showing the arrangement of the electronic camera in FIG. 14.

FIGS. 14 to 16 are conceptual views showing an arrangement in which the image pickup apparatus according to the present invention is arranged in the form of an electronic camera. FIG. 14 is a perspective view showing the external appearance of an electronic camera 140 as viewed from the front side thereof. FIG. 15 is a perspective view of the electronic camera 140 as viewed from the rear side thereof. FIG. 16 is a sectional view showing the arrangement of the electronic camera 140. In the illustrated example, the electronic camera 140 includes a photographic optical system 141 having an optical path 142 for photography, a finder optical system 143 having an optical path 144 for a finder, a shutter 145, a flash 146, a liquid crystal display monitor 147, etc. When the shutter 145, which is placed on the top of the camera 140, is depressed, photography is performed through an objective optical system 10 for photography. An object image produced by the objective optical system 10 for photography is formed on the image pickup surface of a CCD 20 (corresponding to the image pickup device in FIG. 1) through a filter 151, e.g. a low-pass filter, an infrared cutoff filter, etc. The object image received with the CCD 20 is processed in a signal processing circuit 30 and displayed as an electronic image on the liquid crystal display monitor 147 (corresponding to the display unit 50 in FIG. 1), which is provided on the rear of the camera 140. The signal processing circuit 30 is provided with a recording device 40 (corresponding to the storage unit in FIG. 1) to enable the photographed electronic image to be recorded. It should be noted that the recording device 40 may be provided separately from the signal processing circuit 30. The arrangement may also be such that the photographed electronic image is electronically recorded or written on a floppy disk or the like.

Furthermore, an objective optical system 153 for the finder is placed in the optical path 144 for the finder. A cover glass 154 is provided in front of the objective optical system 153. An object image produced by the objective optical system 153 for the finder is formed on a view frame 157 of a Porro prism 155, which is an image-erecting member. It should be noted that the view frame 157 is placed between a first reflecting surface and second reflecting surface of the Porro prism 155. An ocular optical system 159 is placed behind the Porro prism 155 to lead an erect image to an observer's eyeball E.

Figure 17A:
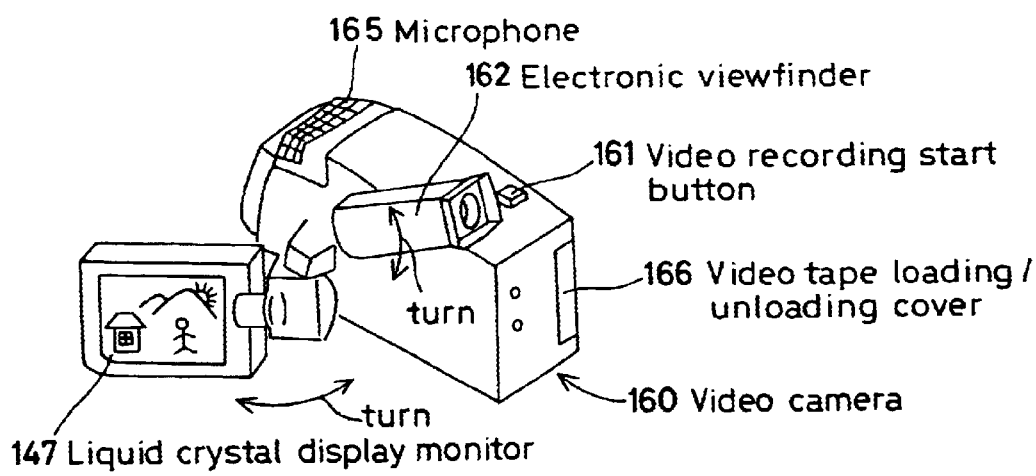
FIG. 17 is a conceptual view showing an image pickup apparatus according to the present invention as arranged in the form of a video camera.
Figure 17B:
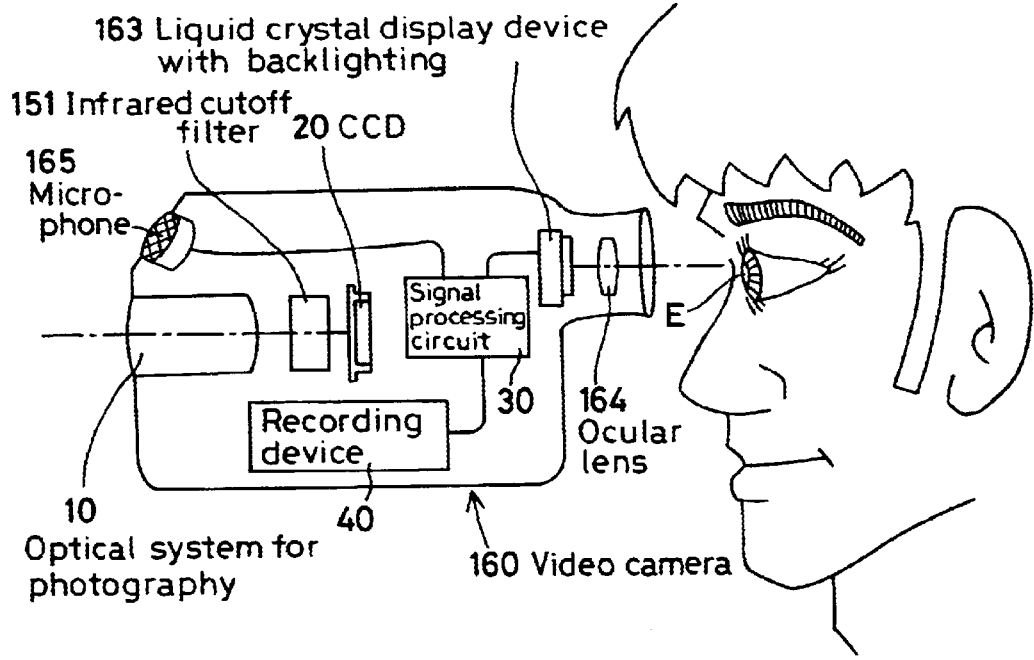

FIG. 17 is a conceptual view showing the image pickup apparatus according to the present invention as arranged in the form of a video camera. Part (a) of FIG. 17 is a perspective view showing the external appearance of a video camera 160, and part (b) of FIG. 17 is a sectional view showing the arrangement of the video camera 160. The video camera 160 has an electronic viewfinder 162 and a liquid crystal display monitor 147 in addition to an optical system 10 for photography. The electronic viewfinder 162 and the liquid crystal display monitor 147 correspond to the display unit 50 in FIG. 1. When a video recording start button 161 placed on the top of the video camera 160 is turned on, video shooting is performed through the optical system 10 for photography. An object image produced by the optical system 10 for photography is formed on the image pickup surface of a CCD 20 (corresponding to the image pickup device in FIG. 1) through a filter 151, e.g. a low-pass filter, an infrared cutoff filter, etc. The object image received with the CCD 20 is processed in a signal processing circuit 30 and displayed on a liquid crystal display device 163 with backlighting, which is placed within the electronic viewfinder 162. The displayed image can be observed as an enlarged image through an ocular lens 164. In addition, the object image is displayed on the liquid crystal display monitor 147, which is foldably mounted on the camera body. A video tape as a recording medium can be set in the video camera 160 by opening a cover 166 for loading and unloading a video tape. The photographed electronic image is recorded on the video tape, which serves as a recording device 40 (corresponding to the storage unit in FIG. 1), through the signal processing circuit 30. Further, the video camera 160 has a microphone 165 to perform speech information recording simultaneously with image signal recording.

As will be clear from the foregoing description and each example, according to the present invention, it is possible to obtain a compact and low-cost image pickup apparatus that is capable of providing high-quality images comparable to silver halide photographs and also capable of obtaining photographic effects equivalent to those which are available for silver halide photographs, e.g. utilization of blurring.

What we claim is:

1. An image pickup apparatus wherein an image of an object produced by an optical system is formed on an electronic image pickup device, thereby obtaining image information concerning the object, wherein said image pickup device is a device having a matrix or mosaic color filter array provided over a photoelectric conversion surface, and said electronic image pickup device and said optical system satisfy the following conditions:

$$6.2/\sqrt{N} < P < 21/\sqrt[\circ]{N} \tag{1}$$

$$3.8 < N < 20 \tag{2}$$

$$3.4 \times P - 25 < N < 20 \tag{3}$$

$$0 < \theta < 1.3 \times P + 4 \tag{4}$$

where P is a pixel pitch (given in micrometers) of the image pickup device; N is the number of pixels (given in million) of the image pickup device; and θ is an angle (°) at which a central ray of a light beam exiting from said optical system or a ray passing through a center of a stop is incident on the image pickup device at a maximum image height.

2. An image pickup apparatus according to claim 1, which satisfies the following condition:

$$7.6/\sqrt{N} < P < 18/\sqrt{N} \tag{5}.$$

3. An image pickup apparatus according to claim 1, which satisfies the following condition:

$$5.0 < N < 20 \tag{6}.$$

4. An image pickup apparatus according to claim 1, which satisfies the following condition:

$$\theta < P + 4 \tag{7}.$$

5. An image pickup apparatus according to claim 1, wherein said optical system has a detachable structure.

6. An image pickup apparatus system comprising:

an electronic image pickup device having a matrix or mosaic color filter array provided over a photoelectric conversion surface, said electronic image pickup device satisfying the following conditions (1) to (3); and a plurality of optical systems prepared to form an image of an object on said electronic image pickup device, said optical systems satisfying the following condition (4):

$$6.2/\sqrt{N} < P < 21/\sqrt{N} \quad (1)$$

$$3.8 < N < 20 \quad (2)$$

$$3.4 \times P - 25 < N < 20 \quad (3)$$

$$0 < \theta < 1.3 \times P + 4 \quad (4)$$

where P is a pixel pitch (given in micrometers) of the image pickup device; N is the number of pixels (given in million) of the image pickup device; and $\theta$ is an angle (°) at which a central ray of a light beam exiting from said optical system or a ray passing through a center of a stop is incident on the image pickup device at a maximum image height.

* * * * *